US005652589A

United States Patent [19]
Ono et al.

[11] Patent Number: 5,652,589
[45] Date of Patent: Jul. 29, 1997

[54] FM-CW MULTIBEAM RADAR APPARATUS

[75] Inventors: Hideaki Ono; Jou Kojima, both of Wako, Japan

[73] Assignee: Honda Giken Kogyo Kabushiki Kaisha, Tokyo, Japan

[21] Appl. No.: 554,677

[22] Filed: Nov. 7, 1995

[30] Foreign Application Priority Data

Nov. 8, 1994 [JP] Japan ................. 6-273977

[51] Int. Cl.⁶ ............... G01S 13/08; G01S 13/93
[52] U.S. Cl. ................ 342/70; 342/79; 342/81; 342/85
[58] Field of Search ............ 342/70, 71, 72, 342/73, 79, 81, 82, 83, 85, 129, 130

[56] References Cited

U.S. PATENT DOCUMENTS

| | | | |
|---|---|---|---|
| 3,860,923 | 1/1975 | Yamanaka et al. | 342/72 |
| 3,864,678 | 2/1975 | Yamanaka et al. | 342/59 |
| 4,143,370 | 3/1979 | Yamanaka et al. | 342/72 |
| 4,349,823 | 9/1982 | Tagami et al. | 342/70 |
| 5,181,037 | 1/1993 | Komatsu | 342/70 |
| 5,229,774 | 7/1993 | Komatsu | 342/70 |
| 5,369,409 | 11/1994 | Urabe et al. | 342/133 |
| 5,546,088 | 8/1996 | Trummer et al. | 342/124 |
| 5,579,010 | 11/1996 | Iihoshi et al. | 342/70 |

Primary Examiner—John B. Sotomayor
Attorney, Agent, or Firm—Lyon & Lyon LLP

[57] ABSTRACT

An FM-CW multibeam radar apparatus includes a plurality of antennas designed to serve both for beam transmission and receiving are arranged in such a manner that radiated beams overlap in part with each other. For sensing a short-distance-away target, a beam is transmitted by means of one of the antennas and a reflected beam is received by a separate adjacent one of the antennas to thereby obtain a beat signal. For sensing a long-distance-away target, one and the same beam transmitter-receiver is used. Upon sensing the short-distance-away target, the per-unit-time amount of change of the frequency of a frequency modulated transmitted signal is set to be larger than that for sensing the long-distance-away target so that a beat signal becomes higher, whereby the distance resolution is improved.

13 Claims, 9 Drawing Sheets

OUTPUT representing detected distance/bearing

OUTPUT representing
detected distance/bearing

FM-CW MULTIBEAM RADAR APPARATUS

BACKGROUND OF THE INVENTION

1. Field of the Invention

The present invention relates generally to an FM-CW multibeam radar apparatus for use as a vehicle-mounted millimetric wave radar apparatus and the like. More particularly, it relates to a multibeam radar apparatus involving a combined use of a monostatic scheme in which a beam is transmitted and received by one and the same antenna, and a bistatic scheme in which a beam is transmitted and received by different antennas, wherein the bistatic scheme is used in detecting at least a short-distance-away target to prevent decrease in accuracy of short-distance-away target detection due to diffraction of a transmitted signal from an antenna-shared circuit such as a circulator to thereby render the radar apparatus capable of detecting both short- and long-distance-away targets with high accuracy.

2. Description of the Related Art

In U.S. Pat. Nos. 4,349,823, 5,181,037, 5,229,774 and 5,369,409, the present Assignee has proposed a multibeam radar apparatus in which a plurality of beams with different directivity characteristics are arranged to be radiated in a time divided fashion for detecting not only the distance to a target but also the bearing of the latter.

Reference is made to FIG. 7 in which a conventional FM-CW multibeam radar apparatus is shown in a block diagram. The radar apparatus 100 comprises: a plurality of (e.g., four) beam transmitter-receivers 101A–101D; a transmitted signal switch 104 for switching the destination of a transmitted signal 103a generated by an FM signal generator 103 in accordance with transmitter-receiver channel designating information 102a supplied from a switching control 102; a received signal selector 106 for selecting a beat signal supplied to a distance/bearing detector 105 in accordance with the transmitter-receiver channel designation information 102a; and a sweep control 107 for supplying a frequency designation voltage signal 107a to a voltage-controlled FM signal generator 103 in accordance with a sweep instruction 102b supplied from the switching control 102 and for performing frequency modulation (FM) to the transmitted signal 103a.

Each beam transmitter-receiver 101A–101D comprises: a power distributor 111; a circulator 112, transmitter-receiver shared antennas 113A–113D; and a mixer (mixing circuit) 114. The circulator 112, designed to separate transmitted and received signals, supplies a signal 111a transmitted from the power distributor 111 to an antenna 113 and supplies a signal received by an antenna 113 to the mixer 114. Use of the circulator 112 allows both transmission and receiving to be performed by a single antenna. The mixer 114 mixes a transmitted signal 111b from the power distributor 111 with a received signal 112a supplied via the circulator 112 to output a beat signal BS (BSA-BSD).

FIG. 8 illustrates beam directional characteristics of individual beam transmitter-receivers. Four antennas 113A–113D having substantially identical pencil beams are arranged such that the beams of adjacent two antennas partially overlap with each other. Consequently, the distance to and bearing of the target can be sensed by selectively switching the beam transmitter-receivers 101A–101D for performing transmission/receiving and measuring the frequency and level of a beat signal BS for each pointed direction.

For effecting transmission/receiving with one and the same antenna, a transmitted signal and a received signal need to be separated by the circulator 112. However, since the circulator 112 has limited separation performance, part of the transmitted signal 111a leaks out into the received signal 112a. As a result, a noise component is generated in a low frequency region of the beat signal BS output from the mixer 114.

FIG. 9 is a graph showing the frequency spectrum of a beat signal.

Due to the limited separation performance of the circulator 112, a noise having 1/f (f: frequency) characteristics is generated, whereby the noise level of a particular target becomes larger than the original level of an associated beat signal. Under these circumstances, since the frequency of a beat signal is proportional to the distance to a target, difficulty is experienced in short-distance-away target detection involving beat signals with small frequency values.

SUMMARY OF THE INVENTION

It is an object of the present invention to provide a multibeam radar apparatus capable of detecting a short-distance-away target without adversely affecting the bearing resolution with respect to a long-distance-away target. According to the present invention, there is provided an FM-CW multibeam radar apparatus comprising a plurality of beam transmitter-receivers which are designed to radiate beams and receive signals reflected by a target and arranged in such a manner that two adjacent beams overlap in part with each other, wherein for sensing at least a short-distance-away target, a beam is transmitted by means of one of the transmitter-receivers and a reflected beam is received by a separate adjacent one of the transmitter-receivers. Upon sensing a short-distance-away target, a beam is received by a transmitter-receiver different from a transmitter-receiver used for beam transmission. Since different systems are used for beam transmission and receiving, no transmitted signal will pass into a received signal from an antenna-shared circuit such as a circulator. As a result, noises to be generated in a low-frequency region of a beat signal output from a mixer are reduced, whereby detection of an original beat signal is enabled and short-distance-away target sensing can be performed with high accuracy.

In the FM-CW multibeam radar apparatus according to the present invention, the per-unit-time amount of change of the frequency of a transmitted wave for sensing a short-distance-away target is made larger than that for sensing a long-distance-away target. As a result, a beat signal having a higher frequency can be obtained even if the distance to a target is short. That is, since a beat frequency per unit distance becomes higher, the distance resolution increases. Further, since the frequency of the beat signal become high, influence of 1/f noises may be reduced, whereby short-distance-away target detection is performed with increased accuracy.

BRIEF DESCRIPTION OF THE DRAWINGS

Preferred embodiments of the present invention will now be described, by way of example only, with reference to the accompanying drawings, in which.

DETAILED DESCRIPTION

Figure 1:
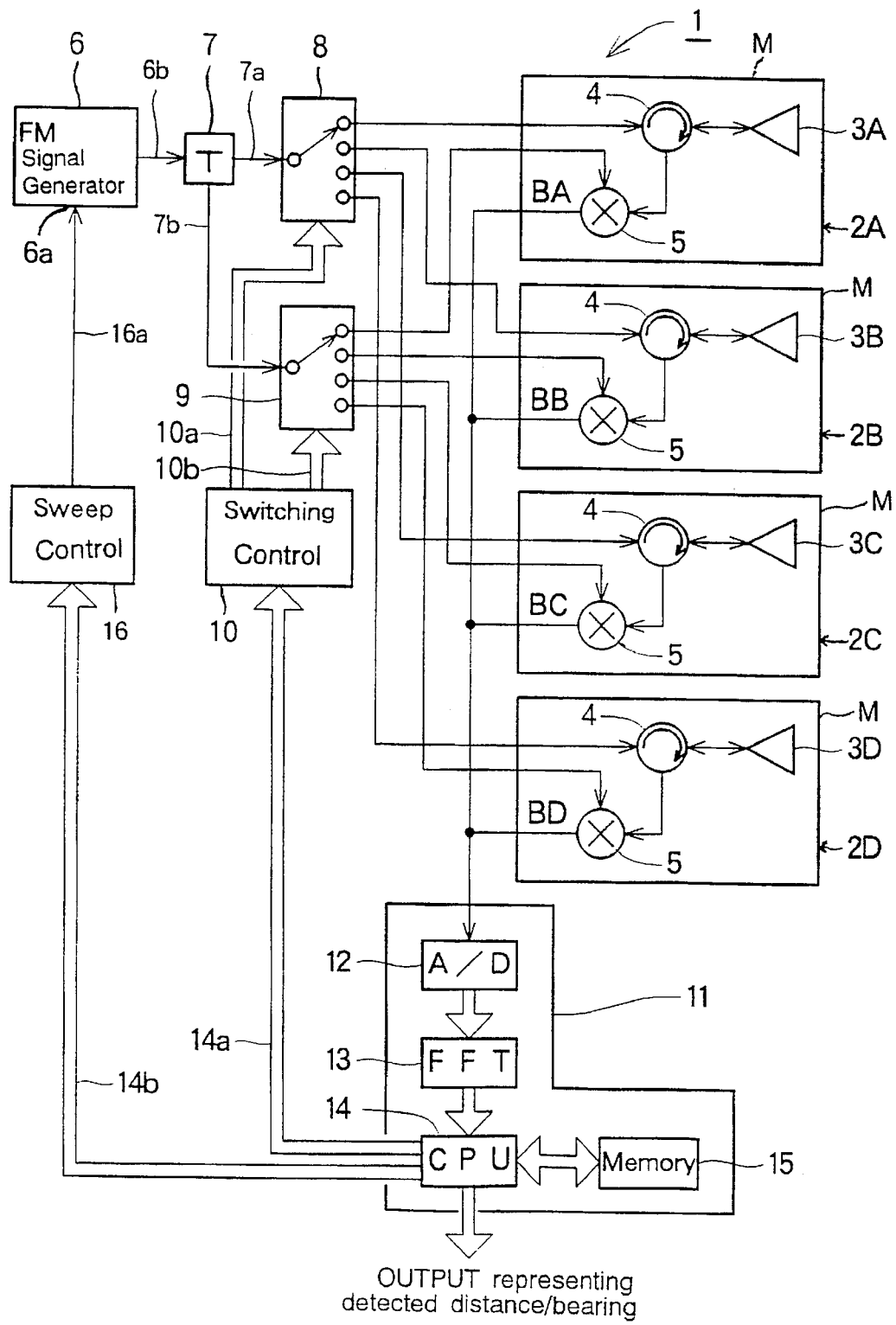
FIG. 1 is a block diagram illustrating an FM-CW multibeam radar apparatus according to the present invention.

Reference is initially taken to FIG. 1 in which an FM-CW multibeam radar apparatus according to the present invention is shown in a block diagram.

Figure 8:
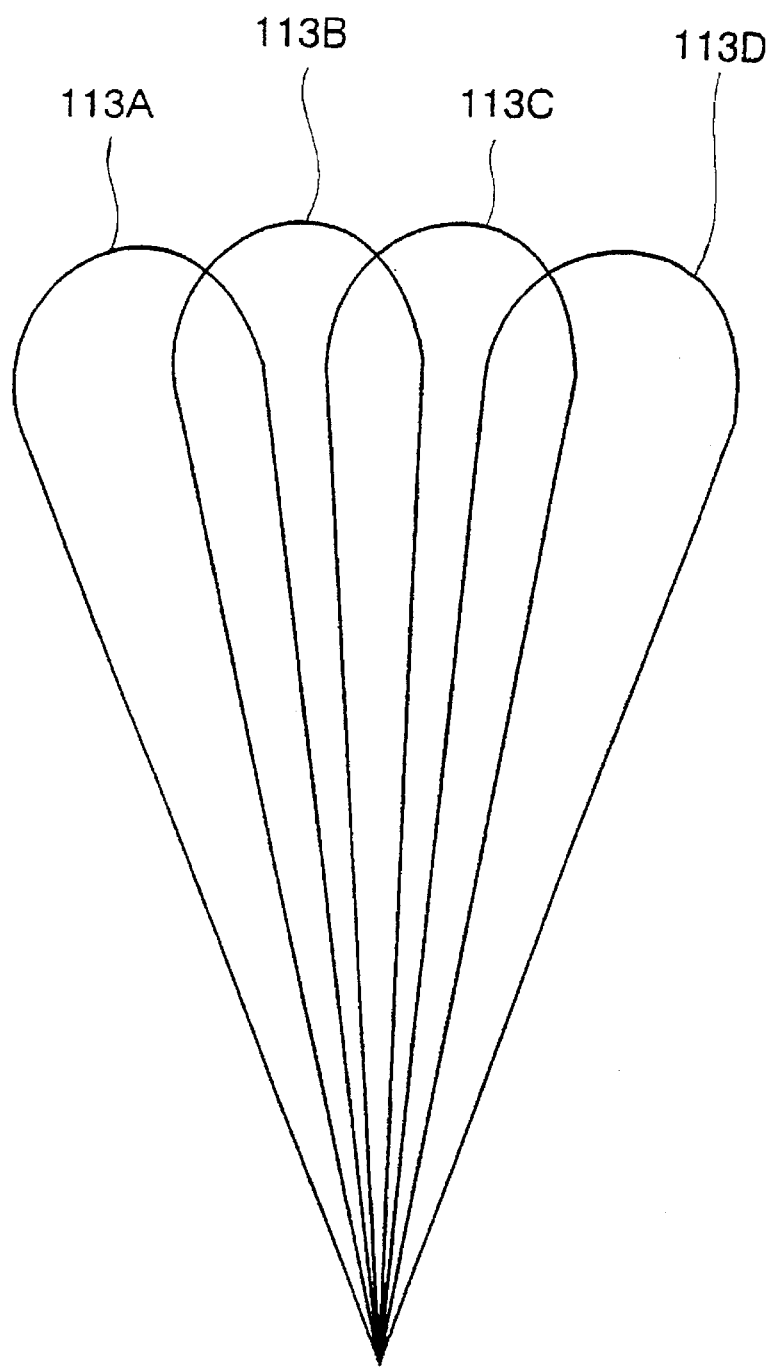
FIG. 8 is a schematic view showing beam characteristics of individual beam transmitter-receivers.
Figure 9:
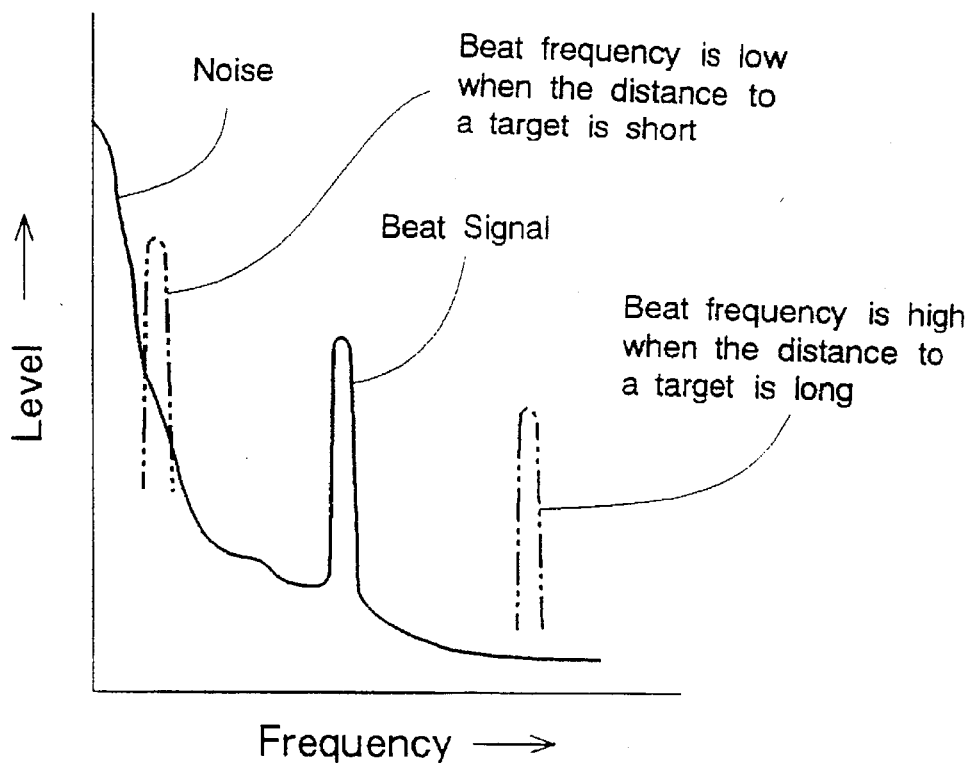
FIG. 9 is a graph showing the frequency spectrum of a beat signal.

A multibeam radar apparatus 1 includes a plurality of (e.g., four) beam transmitter-receivers 2A–2D, which are accommodated within respective metal cases M. Each transmitter-receiver 2A–2D has an antenna capable of both transmission and receiving, a circulator 4, and a mixer (mixing circuit) 5. The antennas with transmission/receiving capabilities 3A–3D have substantially identical beam directivity. As shown in FIG. 8, the antennas 3A–3D are arranged such that their respective beams overlap with each other. In place of these antennas, independent antennas may be employed which are arranged in such a manner that a beam of one antenna overlaps with a beam of an adjacent antenna. Alternatively, the transmitter-receivers may be comprised of an offset defocus parabolic multibeam antenna having four primary radiators arranged at different angles adjacent to the focus of a common parabolic reflector in an opposed relation thereto.

An FM signal generator 6 is a voltage-controlled oscillator which is adapted to generate a signal of about 60 GHz and output a signal having a frequency corresponding to a frequency-designating voltage signal 16a supplied to the frequency control terminal 6a. The FM signal generator 6 is comprised of a Gunn diode and a variable-capacitance diode, such as a vatactor diode. When need arises, an arrangement may be employed which comprises a frequency multiplier or a power amplifier or which comprises an MMIC formed of an HEMT and the like.

By means of a power distributor 7, FM signals 6b output from the FM signal generator 6 are distributed as a transmitted signal 7a and a local oscillation signal 7b. The transmitted signal 7a is supplied via the transmitted signal switching circuit 8 to any one of the beam transmitter-receivers 2A–2D. The local oscillation signal 7b is supplied via a local oscillation signal switching circuit 9 to any one of the beam transmitter-receivers 2A–2D. Each signal switching circuit 8, 9 is switched in accordance with respective switching commands 10a, 10b supplied from a switching control 10. Since it is arranged to be switched independently, each signal switching circuit 8, 9 can supply the transmitted signal 7a and local oscillation signal 7b to any desired one of the beam transmitter-receivers 2A–2D. Thus, the radar apparatus is constructed to be used in two different modes of operation, namely, a monostatic mode in which the transmitted signal 7a and local oscillation signal 7b are supplied to one and the same transmitter-receiver and both beam transmission and receiving are carried out by that transmitter-receiver, and a bistatic mode in which a beam is transmitted by one of two adjacent beam transmitter-receivers with respective antennas having similar beam directional characteristics and is received by the other one of the transmitter-receivers.

The mixer 5 is designed to operate and output a beat signal (output obtained through mixing and frequency conversion of the local oscillation signal 7b and the received signal from the circulator 4) as the local oscillation signal 7b is supplied thereto and output nothing as the local oscillation signal 7b is not supplied thereto. Thus, the radar apparatus is not provided with a circuit for switching/selecting beat signals BA–BD of the respective beam transmitter-receivers 2A–2D but is constructed such that beat signals of the beam transmitter-receiver, to which the local oscillation signal 7b is supplied via the local oscillation signal switching circuit 9, may be supplied to a distance/bearing detector 11.

The distance/bearing detector 11 comprises: an A/D converter 12 for A/D converting a beat signal and outputting a digital beat signal; a fast Fourier transformer (FFT) 13 for applying a fast Fourier transformation to the digital beat signal to output frequency spectrum data; a CPU 14; and a memory section 15. The CPU 14 outputs a transmitter-receiver beam designation command 14a to selectively switch beam transmitter-receivers for beam transmission and beam transmitter-receivers for beam receiving via the switching control 10, and supplies a sweep command 14b to a sweep control 16 to control the sweep period (amount of change in transmitted frequency per unit time) of FM signals as well. In addition, referring to various frequency spectrum data, the CPU 14 determines the distance to and bearing of a target and outputs the results. The memory section 15 comprises a ROM for storing control programs and a RAM for temporarily storing the frequency Spectrum data, operation results and the like.

Figure 2:
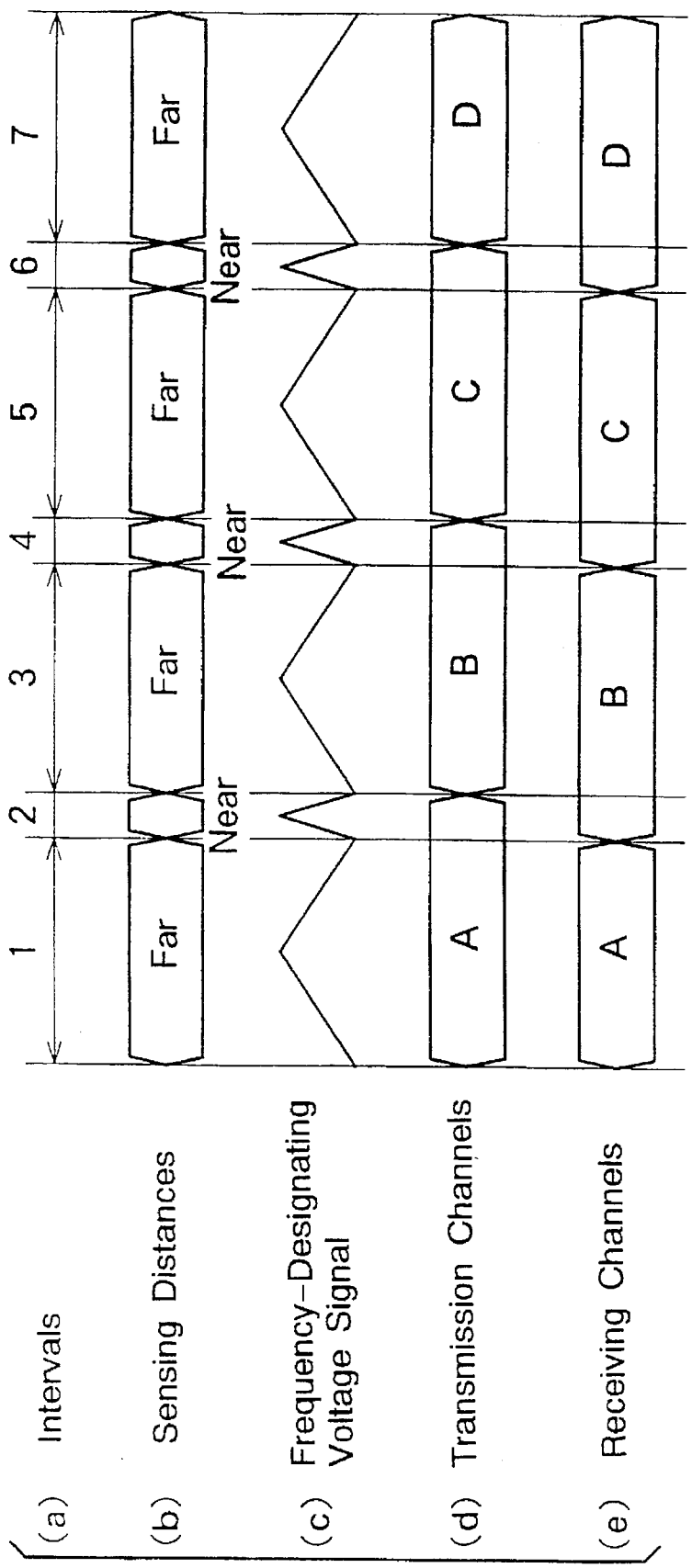
FIG. 2 is a time chart showing operation of the multibeam radar apparatus.

FIG. 2 is a time chart showing operation of the multibeam radar apparatus.

In sensing a long-distance-away (faraway) target with the distance/bearing detector 11, one and the same beam transmitter-receiver is used whilst different beam transmitter-receivers are used in sensing a short-distance-away (close-by) target. Different sweep periods of the transmitted signals are chosen for sensing the long- and short-distance-away targets.

FIG. 2 shows an example in which a long-distance-away target and a short-distance-away target are sensed alternately. In accordance with the sweep command 14b corresponding to a distance to be sensed, the frequency-designating voltage signal 16a shown in FIG. 2, (c), is supplied to the sweep control 16, and the FM signal 6b, frequency-modulated by a triangular wave, is output from the FM signal generator 6. The distance/bearing detector 11 outputs a transmitter-receiver beam designating command 14a in synchronization with the sweep timing of transmitted signals and switches the destinations of supply of the transmitted signal 7a and local oscillation signal 7b via the switching control 10, transmitted signal switching circuit 8 and the local oscillation signal switching circuit 9. A frequency modulated electromagnetic wave is radiated from the antenna of the beam transmitter-receiver supplied with the transmitted signal 7a. The mixer 5 of the beam transmitter-receiver supplied with the local oscillation signal 7b becomes operative and outputs a beat signal.

First to fourth beam transmitter-receivers 2A–2D will hereinafter be referred to as channels A–D, respectively. In interval 1 of FIG. 2, sweepage is administered for the long-distance-away target detection, and channel A is designated for both transmission and receiving. Thus, both transmission and receiving are performed through channel A. In interval 2, transmission channel A and receiving channel B are designated, whereafter the bistatic mode is designated in which the beam transmitted from the antenna 3A is received by the antenna 3B having the adjacent beam. Then, as shown in FIG. 2, (d) and (e), the long-distance-away target detection in the monostatic mode for each channel and the short-distance-away target detection in the bistatic mode by means of two adjacent channels are repeated sequentially.

Although FIG. 2 shows a case where the long-distance-away target detection and short-distance-away target detection are performed alternately, other manners of detection are also possible. For example, the long-distance-away target sensing may be performed for each channel sequentially and thereafter the short-distance-away target sensing may be performed in the bistatic mode sequentially with respect to each adjacent channel. Further, although an example was shown in which the beam is transmitted from channel A and received by channel B, an arrangement is also possible wherein the beam is transmitted from channel B and received by channel A.

The distance/bearing detector 11 temporarily stores frequency spectrum data obtained in each interval and calculates and outputs the distance to and bearing of the target as the data for all the intervals are obtained.

In the short-distance-away target sensing, since different channels are used for transmission and receiving and interference by radio frequency is completely eliminated by the metal cases, it is possible to prevent noise increase, due to diffraction of part of the transmitted signal 7a toward the received signal, in beat signals output from the mixer 5. This further leads to reduction of noise generation in a low frequency region, thus enabling the short-distance-away target sensing with high accuracy.

Additionally, when sensing a short-distance-away target, the beat frequency of the beat signals becomes higher even when the time difference between the transmitted wave and received wave is short, because the sweep period of the frequency modulation for the transmitted signals is made shorter and the amount of change in frequency per unit time is made larger. Thus, the distance resolution upon short-distance-away target sensing can be enhanced without enhancing the frequency band resolution of the fast Fourier transformer (FFT) 13.

Figure 3:
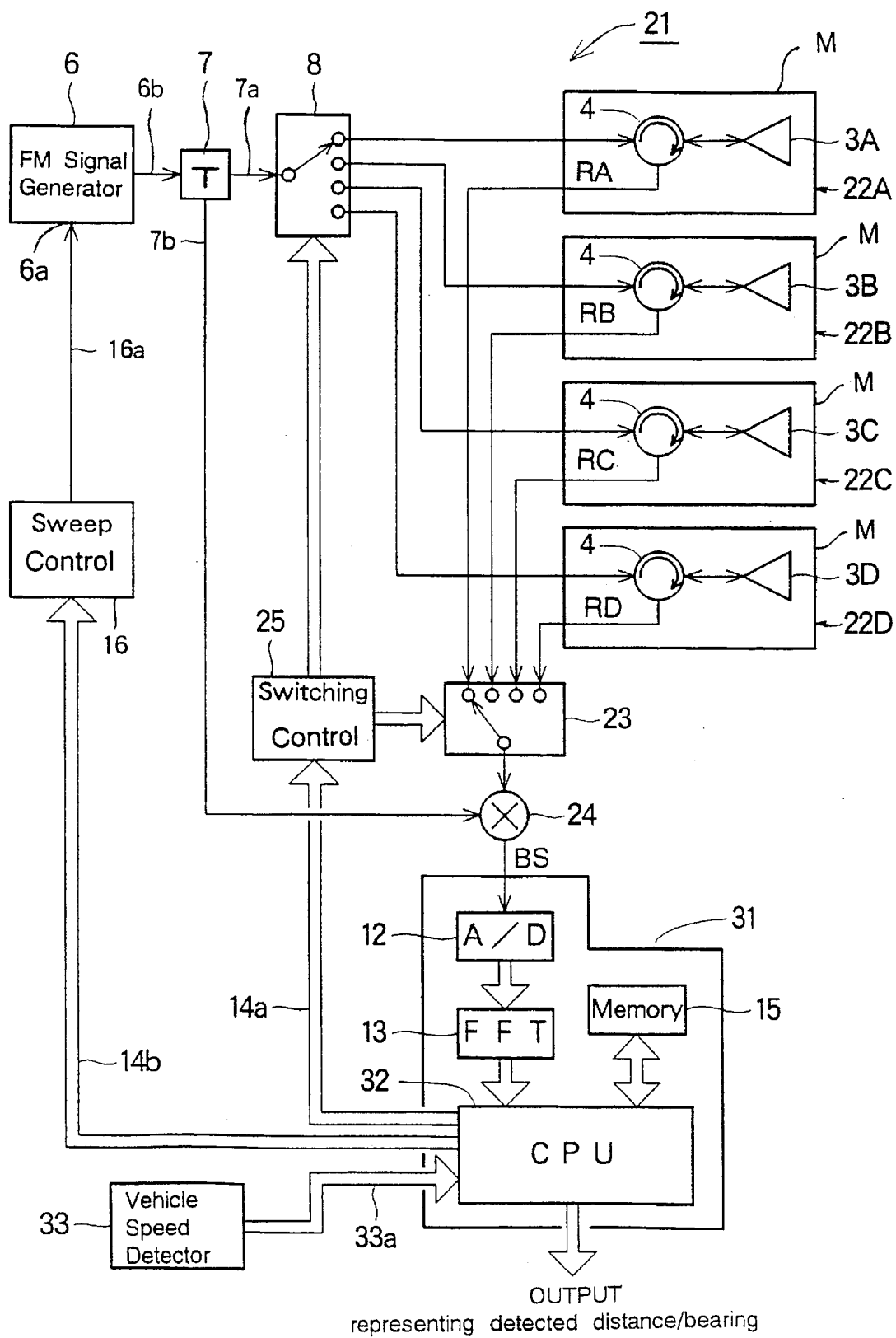
FIG. 3 is a block diagram illustrating a separate FM-CW multibeam radar apparatus according to the present invention.

Reference is now taken to FIG. 3 in which a separate FM-CW multibeam radar apparatus according to the present invention is shown in block diagram.

As shown in the figure, the multibeam radar apparatus 21 is designed to be mounted on the front side of a vehicle and suited for such an application where detection is to be made from the front side of the vehicle. The multibeam radar apparatus 21 is arranged to sense a short-distance-away target in the bistatic mode at a low vehicle speed (e.g., less than 15 km/h), to sense a short- and long- distance-away targets by switching the monostatic and bistatic modes at a middle vehicle speed (e.g., 15–80 km/h) and to sense a long-distance-away target in the monostatic mode in combination with the bistatic mode at a high vehicle speed (e.g., more than 80 km/h).

Each beam transmitter-receiver 22A–22D, accommodated within a metal case M, comprises a circulator 4 and an antenna 3A–3D with transmission and receiving capabilities. Each received signal RA–RD, separated by means of the circulator 4, is arranged to be supplied via a received signal selection circuit 23 to a single mixer (mixing circuit) 24, where a beat signal BS is obtained. In accordance with a transmitter-receiver beam designating command 14a, the switching control 25 selectively switches the transmitted signal switching circuit 8 and the received signal selection circuit 23. On the basis of vehicle speed data 33a supplied from the vehicle speed detector 33, the CPU 32 within the distance/bearing detector 31 judges a current vehicle speed and initiates a sensing operation corresponding to the vehicle speed.

Figure 4:
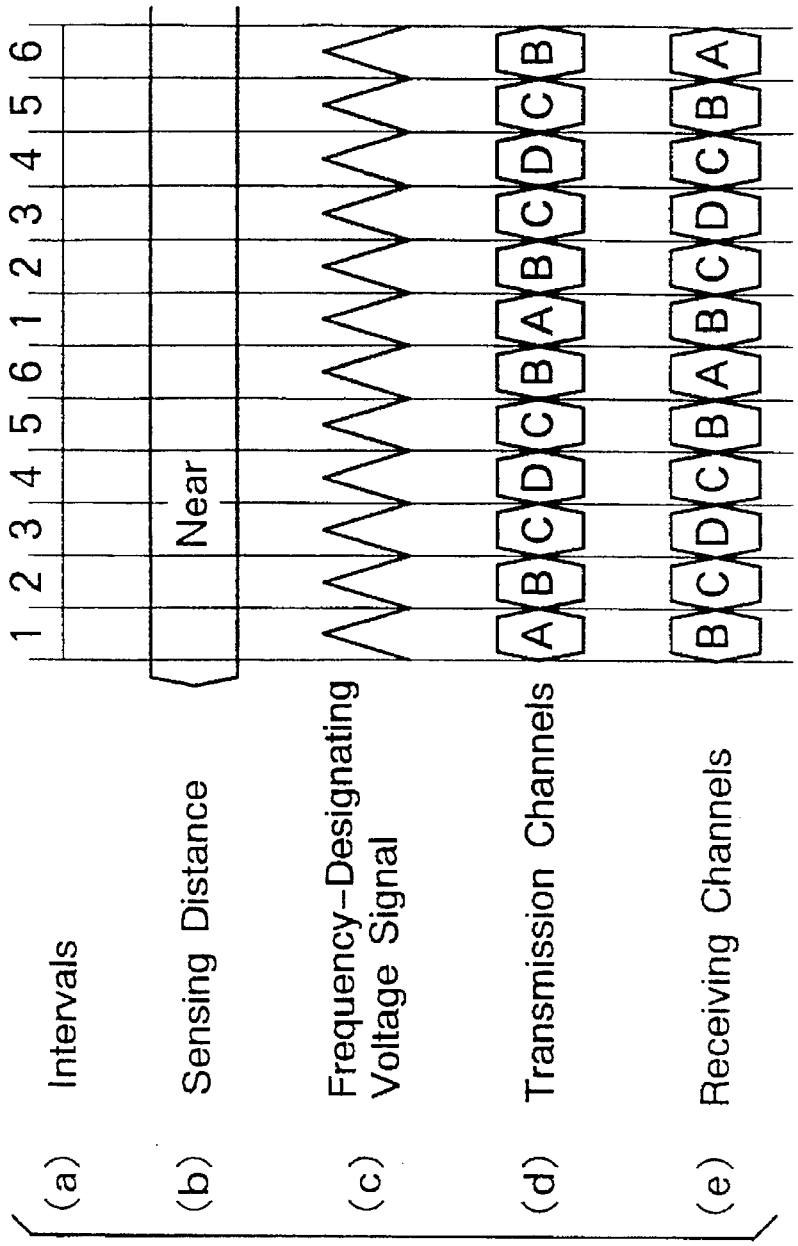
FIG. 4 is a time chart showing operation of the apparatus at a low vehicle speed.

FIG. 4 is a time chart showing operation of the apparatus at a low vehicle speed.

At a low vehicle speed (e.g., less than 15 km/h), beam transmission and receiving are performed through different channels with the sweep period of frequency modulated waves set at a short period used in the short-distance-away target sensing. As a result, a short-distance-away target can be sensed with high accuracy. In addition, since the directions or bearings to be sensed are switched sequentially in short sweep periods, the distance to and bearing of a short-distance-away target can be sensed in a short time.

Figure 5:
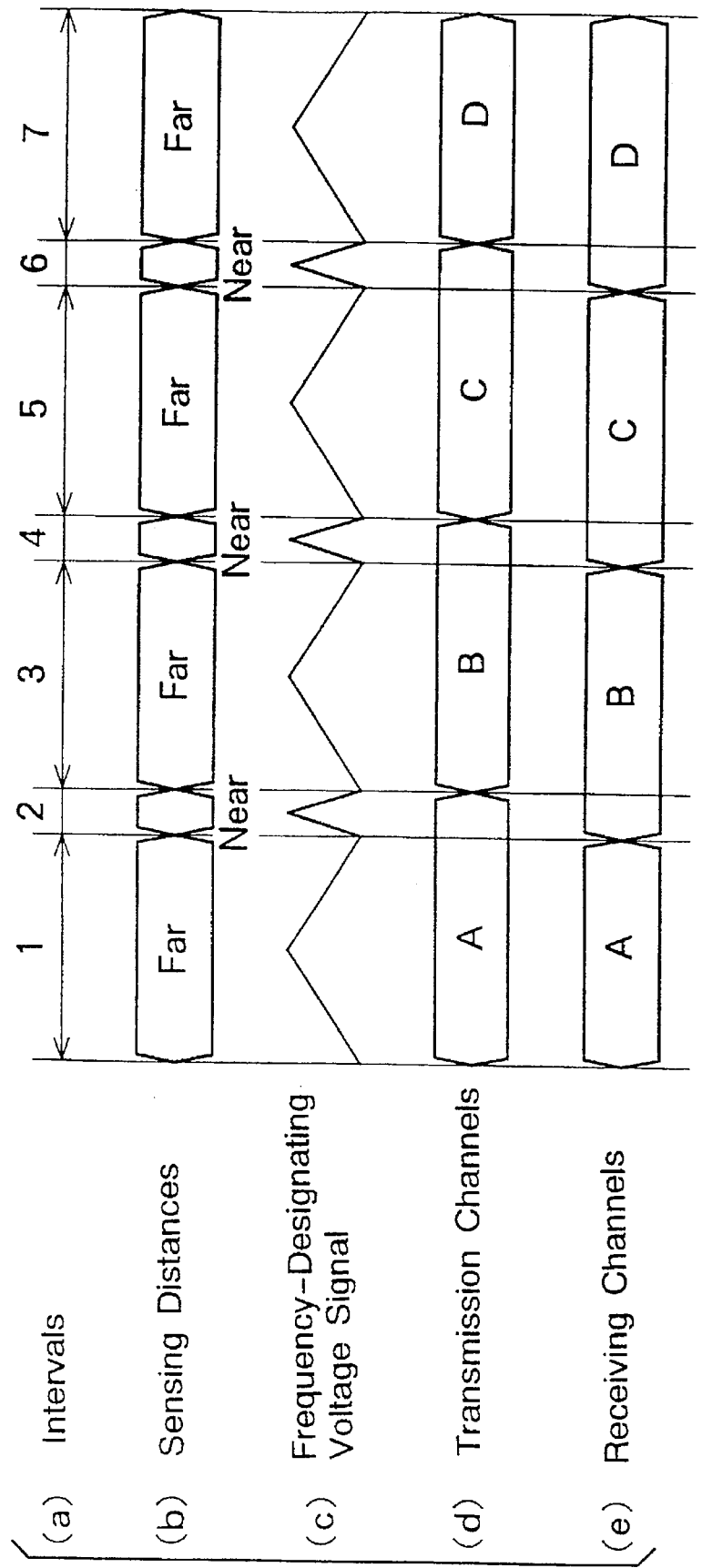
FIG. 5 is a time chart showing operation of the apparatus at a middle vehicle speed.

FIG. 5 is a time chart showing operation of the apparatus at a middle vehicle speed.

At a middle vehicle speed (e.g., 15–80 km/h), different channels are used for transmission and receiving. Further, two different modes of sensing, namely, the short-distance-away target sensing mode in which the sweep period is set at a short one for use in the short-distance-away target sensing and the long-distance-away target sensing mode in which one and the same channel is used and the sweep period is set at a long one used in the long-distance-away target sensing, are alternately employed. With this arrangement it is possible to sense a short-distance-away target with high accuracy as well as a long-distance-away target.

Figure 6:
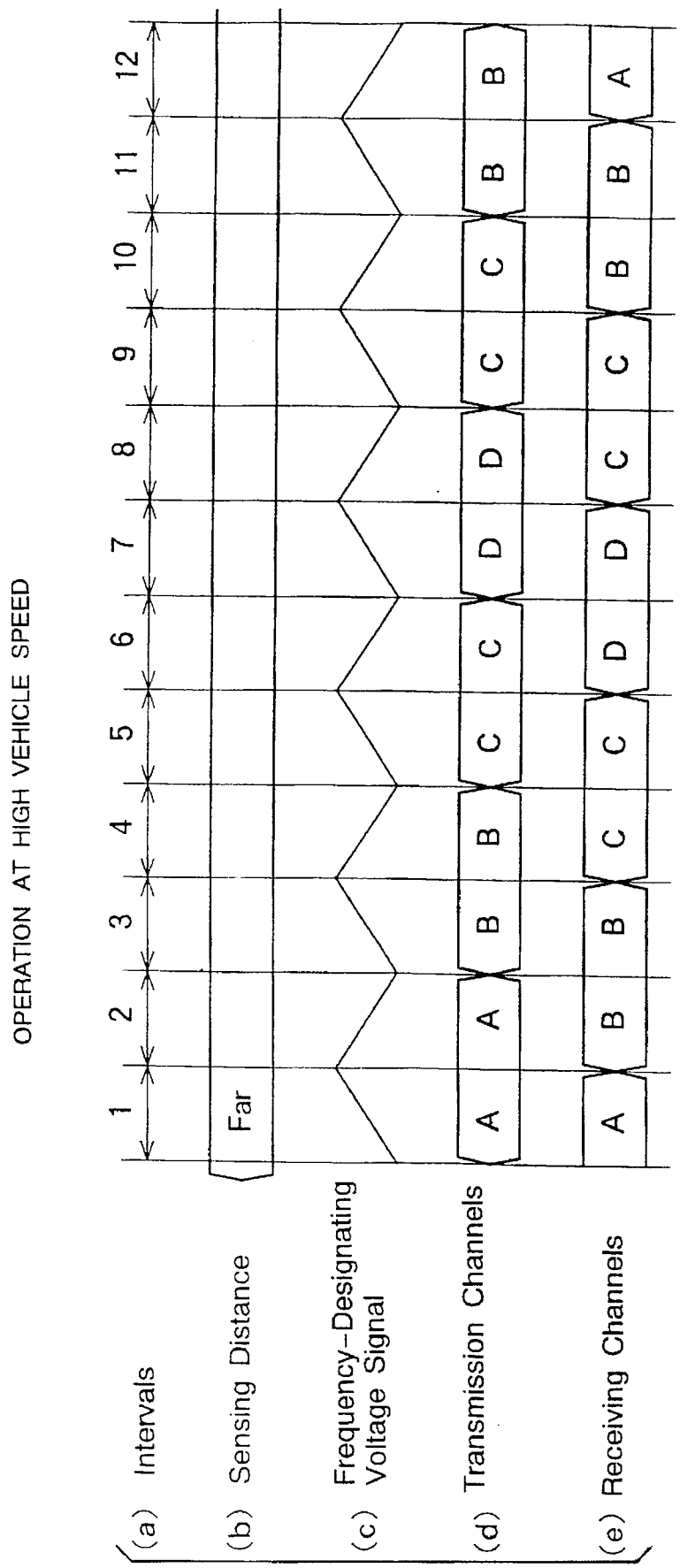
FIG. 6 is a time chart showing operation of the apparatus at a high vehicle speed.
Figure 7:
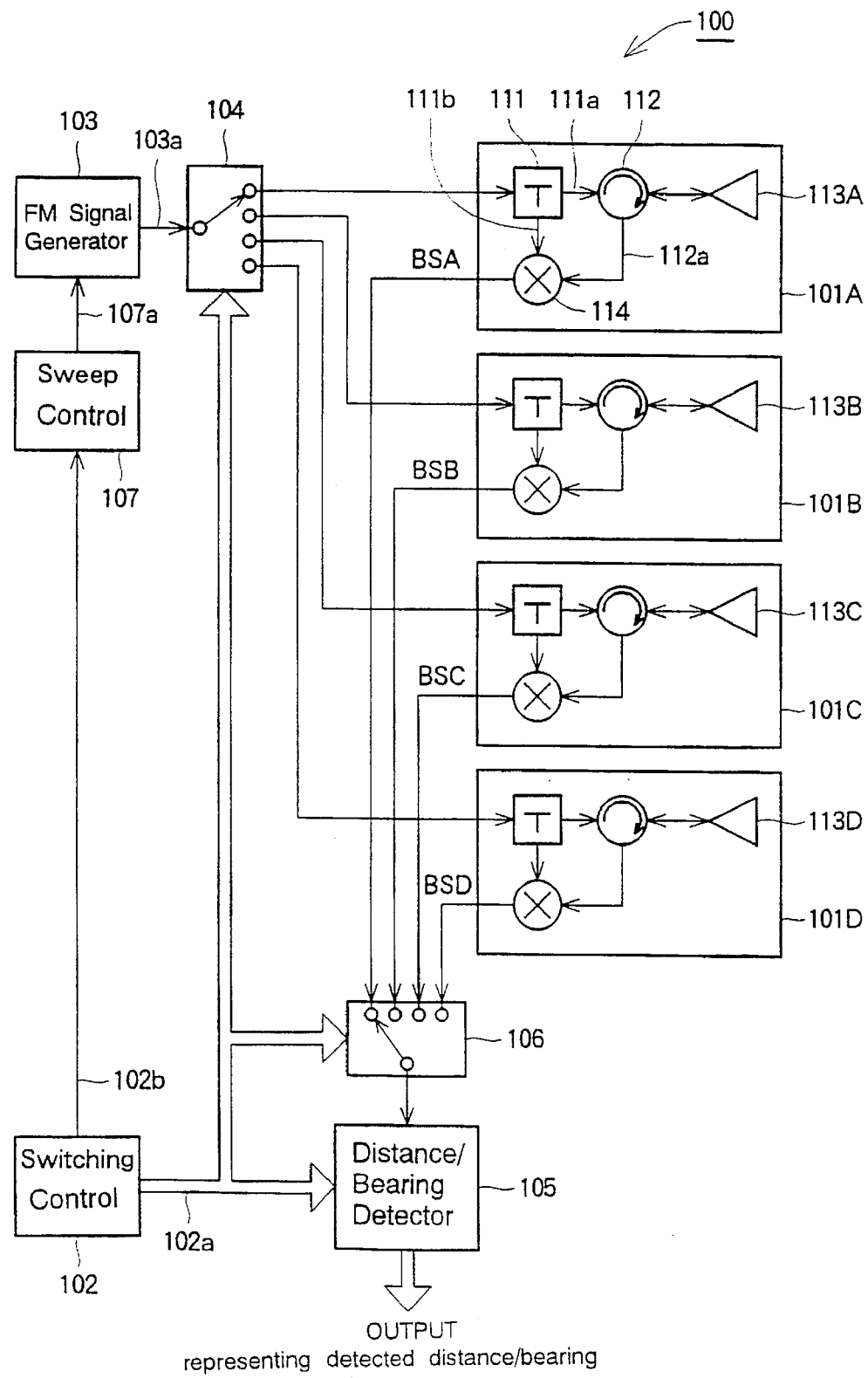
FIG. 7 is a block diagram showing the general arrangement of a conventional FM-CW multibeam radar apparatus.

FIG. 6 is a time chart showing operation of the apparatus at a high vehicle speed.

At a high vehicle speed (e.g., more than 80 km/h), detection with high accuracy of bearings of a long-distance-away target is achieved by setting the sweep period for the frequency modulated waves at a long one used in the long-distance-away target sensing and by a combined use of the monostatic mode and bistatic mode. For example, a beat signal transmitted by channel A and received by channel B can be regarded as a received signal obtained through a virtual antenna disposed between antennas 3A and 3B with similar beam directional characteristics. Thus, bearings of a long-distance-away target can be detected with high accuracy by carrying out calculations, based on a multiplicity of directional bearing measurements, with respect to the level of each bearing. In addition, bearing detection can be completed in a short period of time since the monostatic mode and bistatic mode are switched in each one period of a triangular wave.

It may be readily appreciated by those skilled in the art that the aforesaid mode switching in correspondence to vehicle speeds should not necessarily take the form of the arrangement as shown in FIG. 3 and that such mode switching can also be achieved in the arrangement of FIG. 1.

It should also be noted that the short-distance-away target sensing mode is preferably used for sensing a target at about 1–30 meters away and that sweep frequency of approximately 3 KHz is used in the mode. By contrast, the long-distance-away target sensing mode is preferably used for sensing a target at about 30–150 meters away, and the sweep frequency used in that mode is approximately 300 Hz.

It should additionally be noted that transmission frequency employed in the inventive radar apparatus is comprised of a center frequency of 60 GHz with sweep bands of ±75 MHz according to the Japanese specifications.

As thus far explained, the FM-CW multibeam radar apparatus according to the present invention is designed such that upon sensing a short-distance-away target, a beam is received by a beam transmitter-receiver different from the beam transmitter-receiver through which the beam was transmitted, whereby diffraction of the transmitted signal from an antenna-shared circuit such as a circulator toward the received signal may be avoided. As a result, it becomes possible to reduce noises to be generated in a low frequency region of the beat signal output from the mixer. This further enables detection of the original beat signal and hence short-distance-away target detection with high accuracy.

Also, in the FM-CW multibeam radar apparatus according to the present invention, since the amount of change per unit time in the frequency of the transmitted waves is made larger for sensing a short-distance-away target than that for sensing a long-distance-away target, a beat signal of high frequency can be obtained even if the distance to a target is short. That is, a beat frequency per unit distance becomes higher and the distance resolution therefore increases. In addition, the beat signal frequency become higher and this reduces the influence of 1/f noises, whereby sensing of a short-distance-away target with high accuracy is achieved.

What is claimed is:

1. An FM-CW multibeam radar apparatus wherein a monostatic antenna is used in sensing a long-distance-away target and a bistatic antenna is used in sensing a short-distance-away target.

2. An FM-CW multibeam radar apparatus according to claim 1 wherein the radar apparatus includes a plurality of multichannels and a beam is scanned by switching the plurality of multichannels in a time divided fashion.

3. An FM-CW multibeam radar apparatus according to claim 1 including a switching system and wherein said monostatic antenna and said bistatic antenna are switched in a time divided fashion.

4. An FM-CW multibeam radar apparatus according to claim 3 wherein a radar system is mounted on a vehicle and timing for switching said monostatic antenna and said bistatic antenna is changed in correspondence to a vehicle speed.

5. An FM-CW multibeam radar apparatus comprising a plurality of beam transmitter-receivers which are designed to radiate beams and receive signals reflected by a target and arranged in such a manner that two adjacent beams overlap in part with each other, wherein said apparatus further comprises means for changing the sensing distance in correspondence to a vehicle speed.

6. An FM-CW multibeam radar apparatus as in claim 5 wherein the transmitter-receivers are designed to operate in monostatic and bistatic modes, and the apparatus is switched to the bistatic mode for sensing short distances to a target and switched to the monostatic mode for sensing long distances to a target, and the means for changing the sensing distance comprises switching means for switching between the monostatic and bistatic modes.

7. An FM-CW multibeam radar apparatus as in claim 6 wherein the switching between the monostatic and bistatic modes is changed in correspondence to vehicle speed.

8. An FM-CW multibeam radar apparatus comprising a plurality of beam transmitter-receivers which are designed to radiate beams and receive signals reflected by a target and arranged in such a manner that two adjacent beams overlap in part with each other for sensing short-distance and long-distance targets, wherein for sensing at least a short-distance-away target a beam is transmitted by means of one of said transmitter-receivers and a reflected beam is received by a separate adjacent one of said transmitter-receivers, and wherein the per-unit-time amount of change of the frequency of a transmitted wave for sensing the short-distance-away target is larger than that for sensing a long-distance-away target.

9. An FM-CW multibeam radar apparatus according to claim 8 wherein the radar apparatus has a monostatic mode in which a transmitted signal and a received signal are carried out by the same transmitter-receiver and a bistatic mode in which a beam transmitted by one of two adjacent beam transmitter-receivers is received by the other one of the adjacent beam transmitter-receivers, and wherein the monostatic mode is used in sensing a long-distance-away target and a bistatic mode is used in sensing a short-distance-away target.

10. An FM-CW multibeam radar apparatus according to claim 9 wherein the monostatic and bistatic modes are switched in a time divided fashion.

11. An FM-CW multibeam radar apparatus according to claim 10 wherein the radar apparatus is mounted on a vehicle and timing for switching said monostatic and bistatic modes is changed in correspondence to vehicle speed.

12. A method of sensing short distances to a target and sensing long distances to a target using a multibeam radar apparatus having transmitter-receivers including antennas for transmitting and receiving beams the method comprising providing a monostatic mode in which a beam is transmitted and received by one and the same antenna for detecting long distances to a target, and a bistatic mode in which a beam is transmitted and received by different antennas for sensing short distances to a target.

13. A method as in claim 12 wherein switching between the monostatic and bistatic modes is changed in correspondence to a vehicle speed.

* * * * *